United States Patent
Kano

(10) Patent No.: US 7,467,307 B2
(45) Date of Patent: Dec. 16, 2008

(54) ELECTRONIC CIRCUIT AND ELECTRONIC DEVICE

(75) Inventor: Tokuji Kano, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 461 days.

(21) Appl. No.: 11/313,803

(22) Filed: Dec. 22, 2005

(65) Prior Publication Data
US 2006/0271801 A1   Nov. 30, 2006

(30) Foreign Application Priority Data
Dec. 24, 2004   (JP)   ............... 2004-373406

(51) Int. Cl.
G06F 1/00 (2006.01)
G06F 1/26 (2006.01)
G06F 1/32 (2006.01)
(52) U.S. Cl. .......... 713/300; 713/320; 713/322
(58) Field of Classification Search .......... 713/300
See application file for complete search history.

(56) References Cited

U.S. PATENT DOCUMENTS 6,415,388 B1 * 7/2002 Browning et al. .......... 713/322
6,928,559 B1 * 8/2005 Beard .......... 713/300
2004/0230844 A1 * 11/2004 Zalesski .......... 713/300
2005/0044429 A1 * 2/2005 Gaskins et al. .......... 713/300
2005/0268189 A1 * 12/2005 Soltis, Jr. .......... 714/724

FOREIGN PATENT DOCUMENTS

| JP | 5-119872 A | 5/1993 |
| JP | 05-119876 A | 5/1993 |
| JP | 2001-238190 A | 8/2001 |

* cited by examiner

Primary Examiner—Thuan N Du
Assistant Examiner—Michael J Brown
(74) Attorney, Agent, or Firm—Foley & Lardner LLP

(57) ABSTRACT

An electronic circuit according to the present invention has one or more circuit sections which operate according to a variable power supply voltage and a variable clock frequency. In the electronic circuit, active information related to load and/or processing time which changes in real time from a control processing section included in the circuit section is output and, based on the active information, a voltage/frequency setting section which sets values of a power supply voltage and clock frequency is provided. The electronic circuit further includes a voltage controller which controls the power supply voltage to be supplied to the circuit section based on the voltage value set by the voltage/frequency setting section and a clock frequency controller which controls the clock frequency to be supplied to the circuit section based on the frequency value set by the voltage/frequency setting section.

4 Claims, 5 Drawing Sheets

ELECTRONIC CIRCUIT AND ELECTRONIC DEVICE

CROSS-REFERENCE TO RELATED APPLICATION

This application is based upon and claims the benefit of priority from the prior Japanese Patent Application No. 2004-373406, filed on Dec. 24, 2004 the entire contents of which are incorporated herein by reference.

BACKGROUND OF THE INVENTION

1. Field of the Invention

The present invention relates to an electronic circuit and an electronic device using the electronic circuit and, for example, relates to a mobile terminal such as a mobile phone.

2. Description of the Related Art

Conventionally, a plurality of IC chips (chipset) are incorporated in an electronic device such as a mobile terminal. An operating clock is supplied to the chipset. A high-speed clock is supplied to a circuit requiring high-speed operation, and a low-speed clock is supplied to other different circuits. In the case where a further high-speed operation is required, a clock obtained by multiplying the frequency of a high-speed clock is used, in some cases.

Further, there is available a technique that changes a supply voltage in accordance with the clock frequency. For example, a battery-powered integrated circuit to which the above technique has been applied is described in Jpn. Pat. Appln. Laid-Open Publication No. 5-119876. This example selects a supply voltage according to a selection signal output from a processing circuit. When the frequency of an operating clock signal is high, a high supply voltage which is formed by serially connecting two batteries is selected; whereas the frequency of an operating clock signal is low, a low supply voltage which is formed by connecting two batteries in parallel is selected.

Further, an image processor to which the above technique has been applied is described in Jpn. Pat. Appln. Laid-Open Publication No. 2001-238190. This image processor controls a clock signal and a supply voltage to be supplied to a processing circuit in accordance with an operation mode. More specifically, under the control of a CPU in the image processor, the image processor loads image data at a resolution and frame rate specified in accordance with an operation mode, determines the minimum supply voltage and frequency of a clock signal at which the processor can function for each set mode, and controls the clock signal frequency and supply voltage value output from a clock generator and regulator.

However, there is still room for further improvement in order to reduce power consumption.

BRIEF SUMMARY OF THE INVENTION

An object of the present invention is to provide an electronic circuit and electronic device capable of suppressing power consumption to a low level.

According to an aspect of the present invention, there is provided an electronic circuit having a circuit section which operates according to a variable power supply voltage and a variable clock frequency, comprising: a control processing section which is included in the circuit section and outputs active information related to load and/or processing time that changes in real time; a voltage/frequency setting section which receives the active information from the control processing section and sets values of the power supply voltage and clock frequency based on the active information; a voltage controller which controls the power supply voltage to be supplied to the circuit section based on the voltage value set by the voltage/frequency setting section; and a clock controller which controls the clock frequency to be supplied to the circuit section based on the frequency value set by the voltage/frequency setting section.

According to another aspect of the present invention, there is provided an electronic device having a plurality of circuit blocks which operate according to a variable power supply voltage and a variable clock frequency, each of the plurality of circuit blocks including at least one of a first circuit section which processes information at a first clock or a second circuit section which processes information at a second clock having a frequency lower than that of the first clock, comprising: a system base block which is provided in the second circuit section of at least one circuit block of the plurality of circuit blocks and controls the entire operation of the electronic device; a user-operable operation section which is connected to the circuit block provided with the system base block; a clock generator which generates the first and second clocks and supplies the first circuit section and second circuit section with the first clock and second clock, respectively; and a power supply circuit which supplies the circuit sections operating at the first clock with a first power supply voltage and supplies the circuit section operating at the second clock with a second power supply voltage lower than the first power supply voltage.

DETAILED DESCRIPTION OF THE INVENTION

Throughout this description, the embodiments and examples shown should be considered as examplers, rather than limitations on the apparatus of the present invention.

Figure 1:
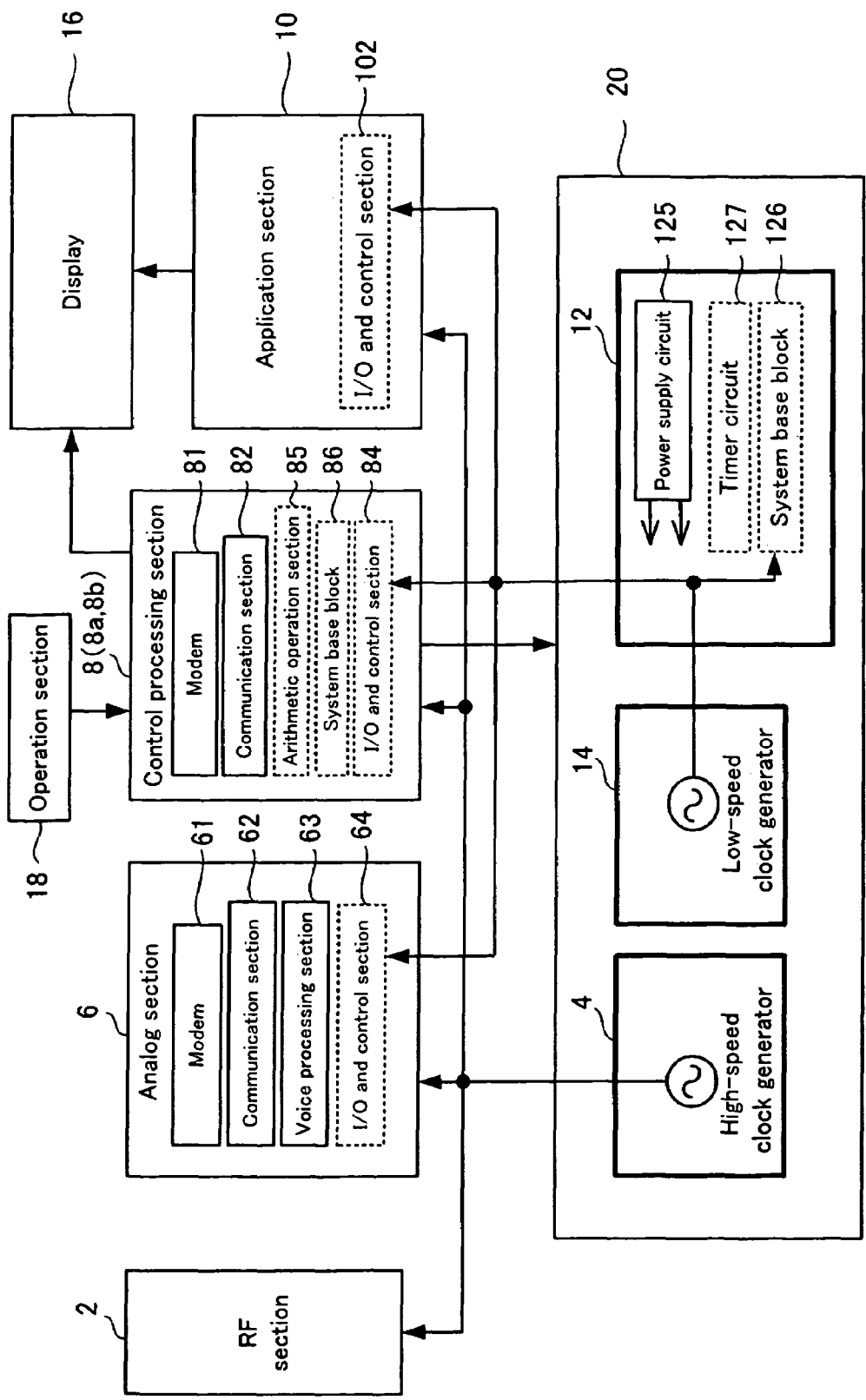
FIG. 1 is a block diagram showing a configuration of a chipset included in an electronic device according to an embodiment of the present invention, such as a terminal having a wireless communication function such as a mobile phone.

FIG. 1 is a block diagram showing a configuration of a chipset included in an electronic device according to an embodiment of the present invention, such as a terminal having a wireless communication function such as a mobile phone.

In FIG. 1, reference numeral 20 denotes a voltage/clock controller which includes a high-speed clock generator 4, a low-speed clock generator 14, and a power supply section 12. A clock signal having a high frequency (hereinafter, referred to as "high-speed clock") is supplied from the high-speed clock generator 4 to respective circuit blocks including an RF section (wireless section) 2, an analog section 6, a control processing section 8, an application section 10, and the like. A clock signal having a lower frequency (hereinafter, referred to as "low-speed clock") than the high-speed clock is supplied from the low-speed clock generator 14 to the above circuit blocks.

The RF section 2 is a circuit block for performing a wireless communication. The RF section 2 operates at a high frequency. A high-speed clock from the high-speed clock generator 4 allows the RF section 2 to function.

The analog section 6 includes a modem 61, a communication section 62, a voice processing section 63, and an I/O and control section 64. The modem 61, communication section 62, and voice processing section 63 operate at a high-speed clock; whereas the I/O and control section 64 operates at a low-speed clock supplied from the low-speed clock generator 14. The I/O is an abbreviation for "Input/Output".

The analog section 6 will concretely be described. The analog section 6 is a circuit for performing a communication and voice processing at a baseband. The modem 61 performs AD conversion (analog-to-digital conversion) and DA conversion (digital-to-analog conversion) for a baseband signal as well as performing modulation/demodulation processing.

The communication section 62 mainly communicates with a base station in the case where it serves as a component of a mobile phone. More specifically, the communication section 62 demodulates a baseband signal input thereto from the RF section 2, applies signal processing to the demodulated signal, and transmits the resultant signal to the control processing section 8 as reception data. Further, the communication section 62 applies signal processing to transmission data transmitted by the control processing section 8, modulates the resultant signal, and transmits the modulated signal to the RF section 2 as a baseband signal. That is, the communication section 62 serves as an interface for transmitting and receiving data and controls the modem 61.

The voice processing section 63 transmits an analog voice signal to a speaker, as well as performs sampling of a voice signal at various clock frequencies to convert it into a digital signal, performs filtering processing for removing external noise, or amplifies a small sound source in order to transmit a voice signal input through a microphone over digital communication.

The I/O and control section 64 is a circuit for exchanging control data and information data with the control processing section 8.

The control processing section 8 is a circuit including a controller for controlling the chipset and entire system and operated by a software program. The control processing section 8 further includes a modem 81, a communication section 82, an arithmetic operation section 85, a system base block 86, and an I/O and control section 84. The control processing section 8 is connected to a display 16 to perform display control for the display 16.

The modem 81 and communication section 82 are digital circuits operating at a high-speed clock. The arithmetic operation section 85, system base block 86, and I/O and control section 84 operate at low-speed clock supplied from the low-speed clock generator 14. A plurality of control processing sections (8a, 8b . . . ) having the same function may be provided.

The control processing section 8 will concretely be described. The modem 81 performs modulation/demodulation processing for a digital signal, data encoding/decoding processing for demodulated/modulated data, or calculation processing for encrypting/decrypting data. The communication section 82 is a circuit for performing a data communication of transmitted and received data according to a protocol software.

The arithmetic operation section 85 is a circuit for applying various arithmetic operations to transmission/reception data processed by the modem 81 and communication section 82, such as a protocol stack operation, a voice data operation, or data communication operation.

The system base block 86 is a circuit for performing basic operations including timer operation, interruption processing, start-up/stop, and reset. The I/O and control section 84 is a circuit for performing exchange of information such as a signal or state with other blocks. The term "state" used here indicates various state including a normal state, stop state, partially operational state, activation state of only a necessary part with respect to the entire system, control processing section, and other respective components, as well as an operational state of a CPU that plays a main role of controlling the system.

The application section 10 is a circuit for processing, e.g., image information to perform display processing. The application section 10 includes an I/O and control section 102 and is connected to a display 16. The I/O and control section 102 performs exchange of information such as a signal or state with other blocks and operates at a low-speed clock supplied from the low-speed clock generator 14.

The power supply section 12 includes a power supply circuit 125 for supplying the chipset and respective blocks in the system with a required operating voltage, a system base block 126, and a timer circuit 127. The system base block 126 and the timer circuit 127 operate at a low-speed clock supplied from the low-speed clock generator 14. The power supply section 12 is a circuit that operates at all times within the system.

More concretely, the system base block 126 is a circuit for performing basic operations including timer operation, interruption processing, start-up/stop, and reset. The timer circuit 127 is a circuit for counting time to generate a system reference time. The power supply section 12 generates a voltage required to allow the respective blocks in the system to operate and supplies the RF section 2, analog section 6, control processing section 8, application section 10, and the like with a power supply voltage.

Further, in FIG. 1, an operation section 18 that can be operated from an external device is provided. The operation section 18 has, for example, a user-operable key input section. The control processing section 8 performs various processing in response to a user's operation. Alternatively, the operation section 18 may be a processor that automatically receives an instruction by software processing.

In general, power consumption of a circuit block operating at a low-speed clock is smaller than that of a circuit block operating at a high-speed clock. In the embodiment of the present invention, components in the system are selectively divided into components that process information at a high-speed clock and those that process information at a low-speed clock, and a power supply voltage to be supplied to the components is correspondingly changed. This limits the number of circuit blocks that operate at a high-speed clock as much as possible, thereby reducing power consumption of the chipset included in the mobile terminal.

Figure 2:
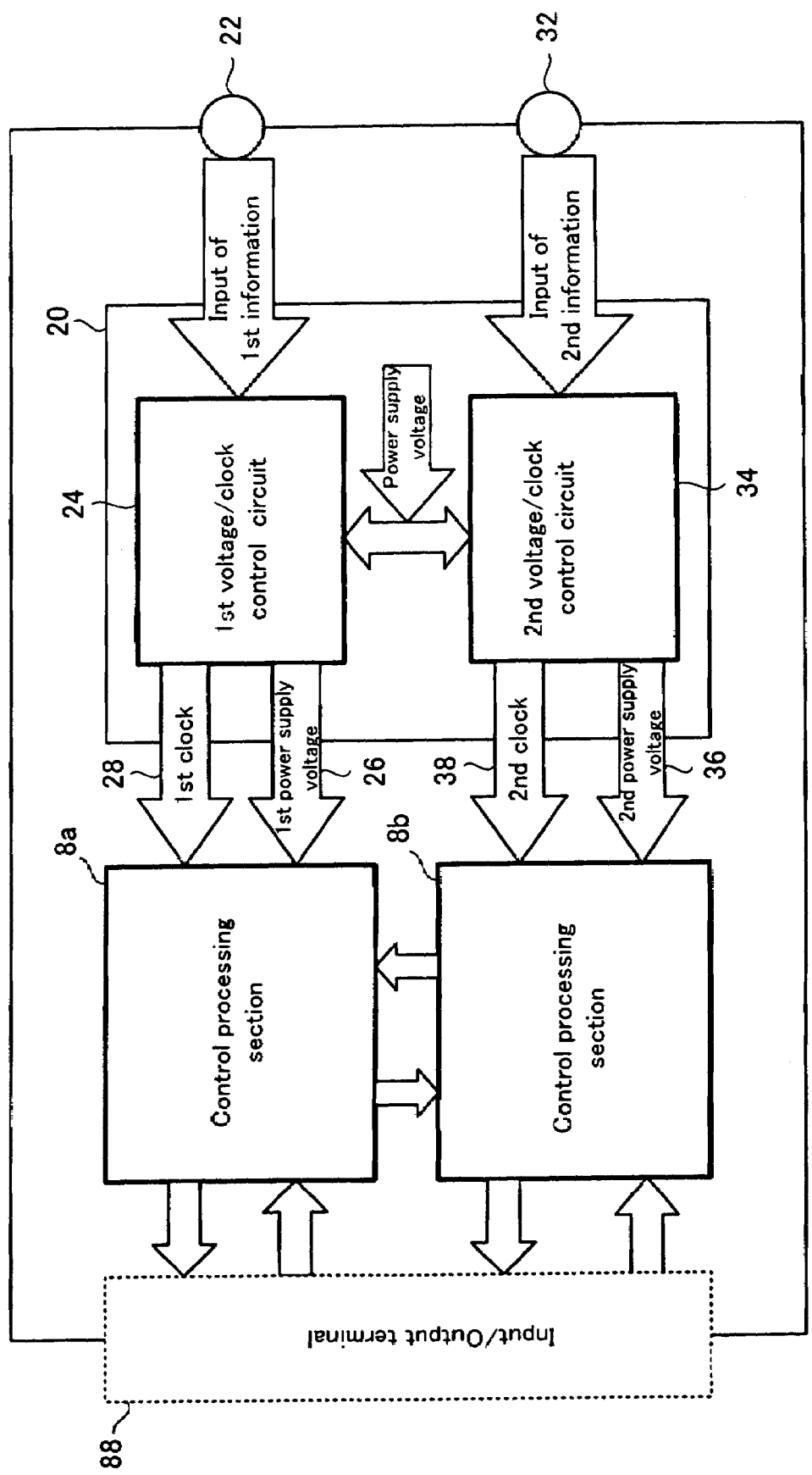
FIG. 2 is a block diagram showing an electronic circuit including a control processing section and a voltage/clock controller shown in FIG. 1.

FIG. 2 is a block diagram showing an electronic circuit including the control processing section 8 and voltage/clock controller 20 shown in FIG. 1 and explaining a method of controlling a power supply voltage and clock for the control processing section 8.

FIG. 2 shows an example in which an electronic circuit has two control processing sections 8a and 8b. The circuit block shown in FIG. 2 exists in respective blocks or a part of blocks in FIG. 1. At least one of the control processing sections 8a and 8b is a control circuit that controls the chipset and system and that is operated by a software program.

The chipset includes a plurality of chips that constitute respective circuit blocks such as RF section 2, analog section 6, control processing section 8, application section 10, and power supply section 12. The system includes peripheral devices such as a display and battery. The entirety of the system is controlled by the control processing section 8.

The voltage/clock controller 20 includes a first voltage/clock control circuit 21 and a second voltage/clock control circuit 34, which have different operating frequency characteristics and voltage characteristics from each other.

The first voltage/clock control circuit 24 supplies the control processing section 8a with a first power supply voltage 26 and a clock (first clock) 28 having a first frequency complying with the operating frequency characteristics and voltage characteristics of the control processing section 8a. That is, the first voltage/clock control circuit 24 controls a clock frequency based on first information input thereto through a first control input terminal 22, and the control processing section 8a processes information based on the controlled first clock 28. Further, the first voltage/clock control circuit 24 generates a sufficient power supply voltage and supplies the control processing section 8a with the first power supply voltage 26 to allow the control processing section 8a to operate at the first clock 28.

The second voltage/clock control circuit 34 supplies the control processing section 8b with a second power supply voltage 36 and a clock (second clock) 38 having a second frequency complying with the operating frequency characteristics and voltage characteristics of the control processing section 8b. That is, the second voltage/clock control circuit 34 controls a clock frequency based on second information input thereto through a second control input terminal 32, and the control processing section 8b processes information based on the controlled second clock 38. Further, the second voltage/clock control circuit 34 generates a sufficient power supply voltage and supplies the control processing section 8b with the second power supply voltage 36 to allow the control processing section 8b to operate at the second clock 38.

A signal for interface with other blocks is input to or output from an input/output terminal 88.

Operation in the configuration shown in FIG. 2 will next be described.

Assume that a clock frequency required for the control processing section 8a to perform predetermined processing is 100 MHz, and a clock frequency required for the control processing section 8b to perform predetermined processing is 50 MHz. In this case, the first voltage/clock control circuit 24 supplies the control processing section 8a with a voltage of 5V, and the second voltage/clock control circuit 34 supplies the control processing section 8b with a voltage of 5.5V.

Assume that a clock frequency required for the control processing section 8a to perform another processing is 200 MHz, and a clock frequency required for the control processing section 8b to perform another processing is 100 MHz. In this case, the first voltage/clock control circuit 24 supplies the control processing section 8a with a voltage of 5.5V, and the second voltage/clock control circuit 34 supplies the control processing section 8b with a voltage of 5.8V.

As described above, when the control processing sections 8a and 8b perform predetermined processing, a clock frequency and a power supply voltage to be supplied to the control processing sections 8a and 8b are variable controlled based on information input through the first information input terminal 22 and second information input terminal 32. When a clock having a frequency and an operating voltage required for respective processings are supplied as described above, it is possible to conduct processing at optimized speed. Further, when the operating voltage for the respective blocks is changed depending on the content of processing, it is possible to reduce power consumption.

Figure 3:
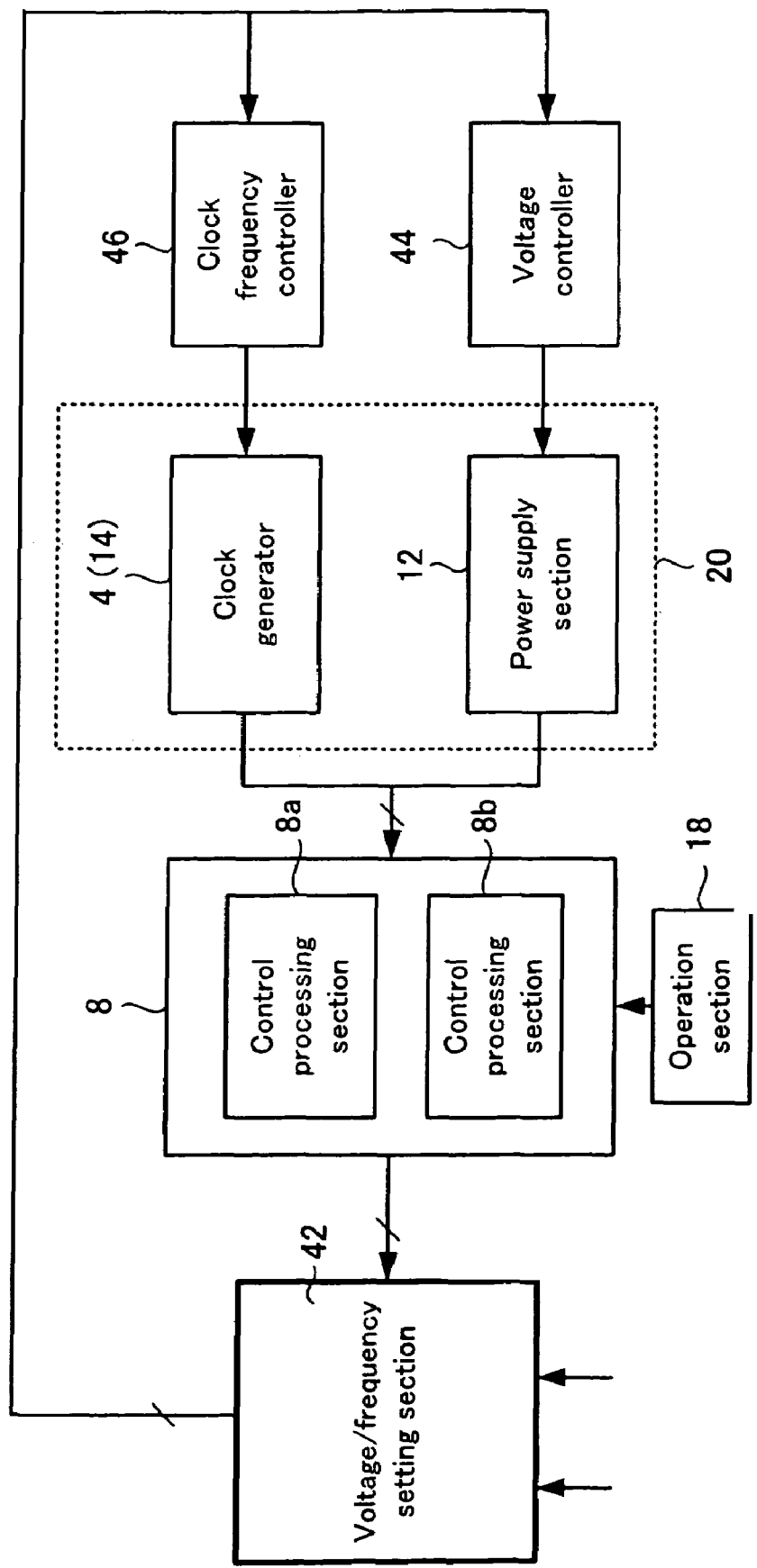
FIG. 3 is a block diagram showing a control system of the voltage/clock controller shown in FIG. 1.

FIG. 3 is a block diagram showing a control system of the voltage/clock controller 20 shown in FIG. 1. More specifically, FIG. 3 shows an electronic circuit that controls a voltage value that the power supply section 12 of FIG. 1 outputs and a frequency value of a clock generated by the high-speed clock generator 4 or low-speed clock generator 14.

A voltage/frequency setting section 42 generates information related to the frequency setting value of a high-speed clock or low-speed clock based on active information related to load and/or processing time, which is supplied from the control processing section 8a or control processing section 8b from among the circuits of the system.

A voltage setting value is supplied to a voltage controller 44, which changes a voltage value output from the power supply section 12 based on the voltage setting value. On the other hand, a frequency setting value is supplied to a clock frequency controller 46. The clock frequency controller 46 changes the frequency value of a high-speed clock generated by the high-speed clock generator 4 or that of a low-speed clock generated by the low-speed clock generator 14 based on the frequency setting value.

The active information includes at least one or more of the following: load information, processing time information, or restriction time information. The load information includes information indicating load involved in the target processing executed on the system and information related to the clock frequency and operating voltage required for the respective circuits on the system to perform processing.

The processing time information is information indicating standard processing time length required to complete the target processing. More specifically, the processing time information indicates execution processing cycle time in the case where the operating frequency and power supply voltage are not changed, or under a given condition. The restriction time information is information to be referred to in the case where a work needs to be completed within a set time length or a work needs to be started and ended at a set time. For example, a communication performed by a mobile phone, in which a communication is performed intermittently and the time length of the communication time period is restricted, corresponds to the above case.

The load information, processing time information, and restriction time information are information that changes in real time depending on the processing state. When a user operates the operation section 18 to execute some processing, at least one of the load information, processing time information, or restriction time information is transmitted to the voltage/frequency setting section 42 from the control processing sections 8a and 8b. Based on the received information, the voltage/frequency setting section 42 can generate information related to a voltage setting value and clock frequency setting value.

As a means for acquiring the active information, various means are available. However, it should be noted that the acquisition means is not crucial to the overall effectiveness of the present invention and the description thereof is not particularly made.

Figure 4:
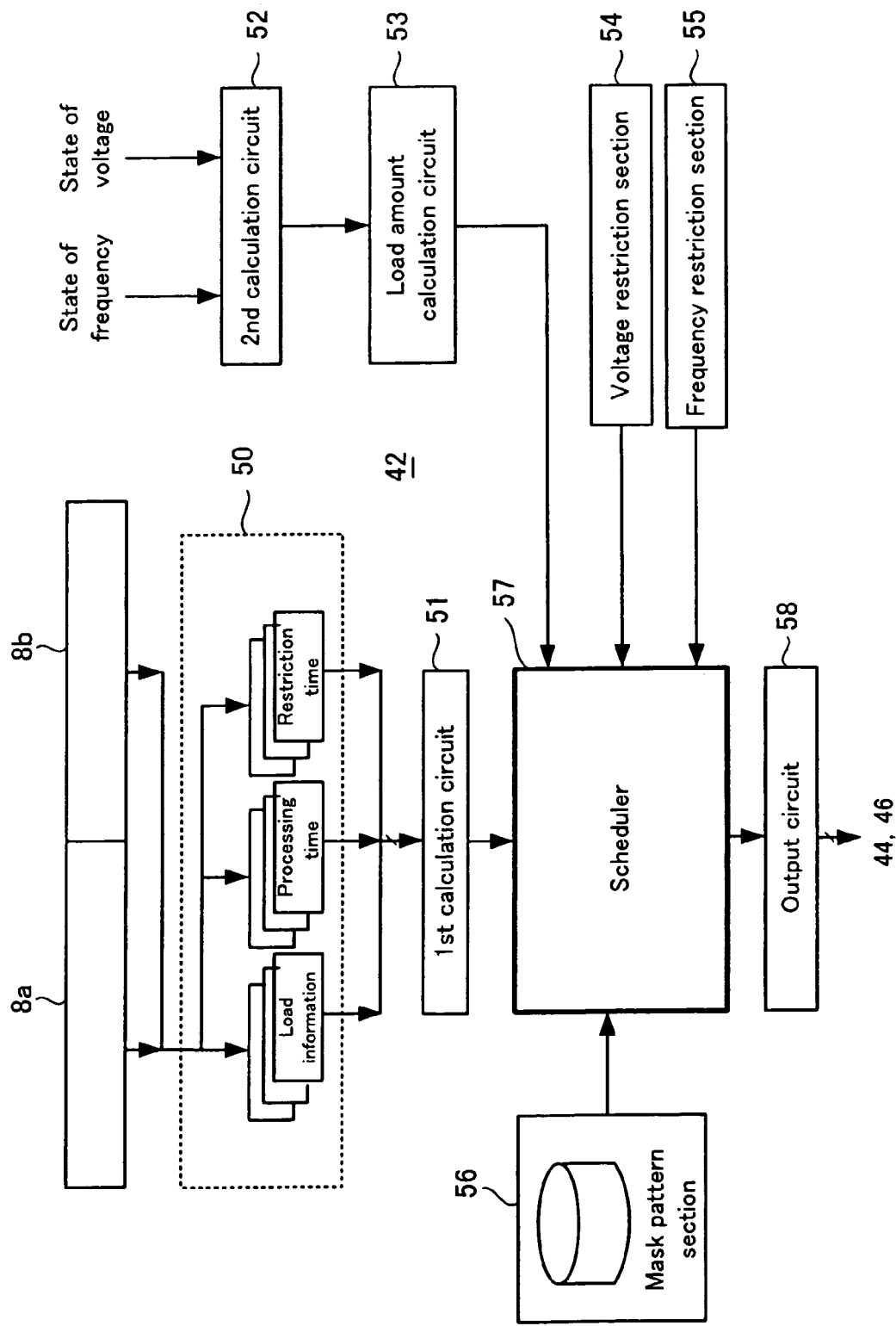
FIG. 4 is a block diagram showing a concrete configuration example of the voltage/clock controller shown in FIG. 3.

FIG. 4 is a block diagram showing a concrete configuration example of the voltage/frequency setting section 42 shown in FIG. 3. The configuration and operation of the voltage/frequency setting section 42 will be described with reference to FIG. 4. Although the processing performed by the voltage/ frequency setting section 42 is realized by a hardware in the example of FIG. 4, the same processing can be realized by a software program.

Firstly, the active information (e.g., load information, processing time information, or restriction time information) that changes in real time depending on the use state is supplied to an information storage device 50 from the control processing section 8a or 8b. The information storage device 50 is constituted by a rewritable memory or the like.

While it is possible to generate information related to the voltage setting value and clock frequency value based on one of the load information, processing time information, or restriction time information, it is possible to use all the above three information to determine the voltage setting value and clock frequency value. This allows more accurate processing and a reduction in power consumption.

Further, the information storage device 50 can store not only information from the control processing section 8a or 8b, but also information from other circuit blocks (analog section 6, application section 10), and FIG. 4 shows an example in which the load information, processing time information, and restriction time information from the respective circuit blocks are stored in different storage areas.

The load information, processing time information, and restriction time information are always in a state of being updated in response to execution of respective processing contents. Therefore, it is virtually impossible to store the above information ahead of time in a ROM. The embodiment of the present invention assumes a mobile phone, in which multiple and diversified processing, such as system processing that is performed at all times, communication processing (processing load changes depending on a communication state), or application processing (use frequency and operating speed change) are performed. Thus, it is impossible to use the information previously stored in a ROM. That is, an object of the present invention is to use the load information, processing time information, restriction time information which change in real time depending on the use state to save power consumption.

The load information, processing time information, restriction time information stored in the information storage device 50 are sequentially read out and supplied to a scheduler 57 through a first calculation circuit 51.

The first calculation circuit 51 calculates a load value required for subsequent processing based on the load information, processing time information, restriction time information and supplies the scheduler 57 with the calculated load value. The first calculation circuit 51 receives the processing time information and restriction time information in association with the load information and adds all processing overlapped at the same time to calculate a load value required for the target processing.

At the same time, a voltage state value and frequency state value are supplied to a second calculation circuit 52, as feedback information related to the operating voltage and feedback information related to the clock frequency, from a block (load) that is executing processing.

The voltage state value is a value indicating a state of the power supply voltage being provided. The frequency state value is a value indicating a state of the clock frequency that is being provided. In order to acquire the voltage state value and frequency state value, a monitor section that monitors a voltage and clock frequency is provided in the control processing sections 8a and 8b, or voltage/clock controller 20.

The second calculation circuit 52 calculates a load value involved in the currently executed processing and calculates the current processing amount based on the voltage state value and frequency state value. Based on a calculation result from the second calculation circuit 52, a load amount calculation circuit 53 calculates a load amount that can be utilized and supplies the scheduler 57 with the load amount.

Figure 5:
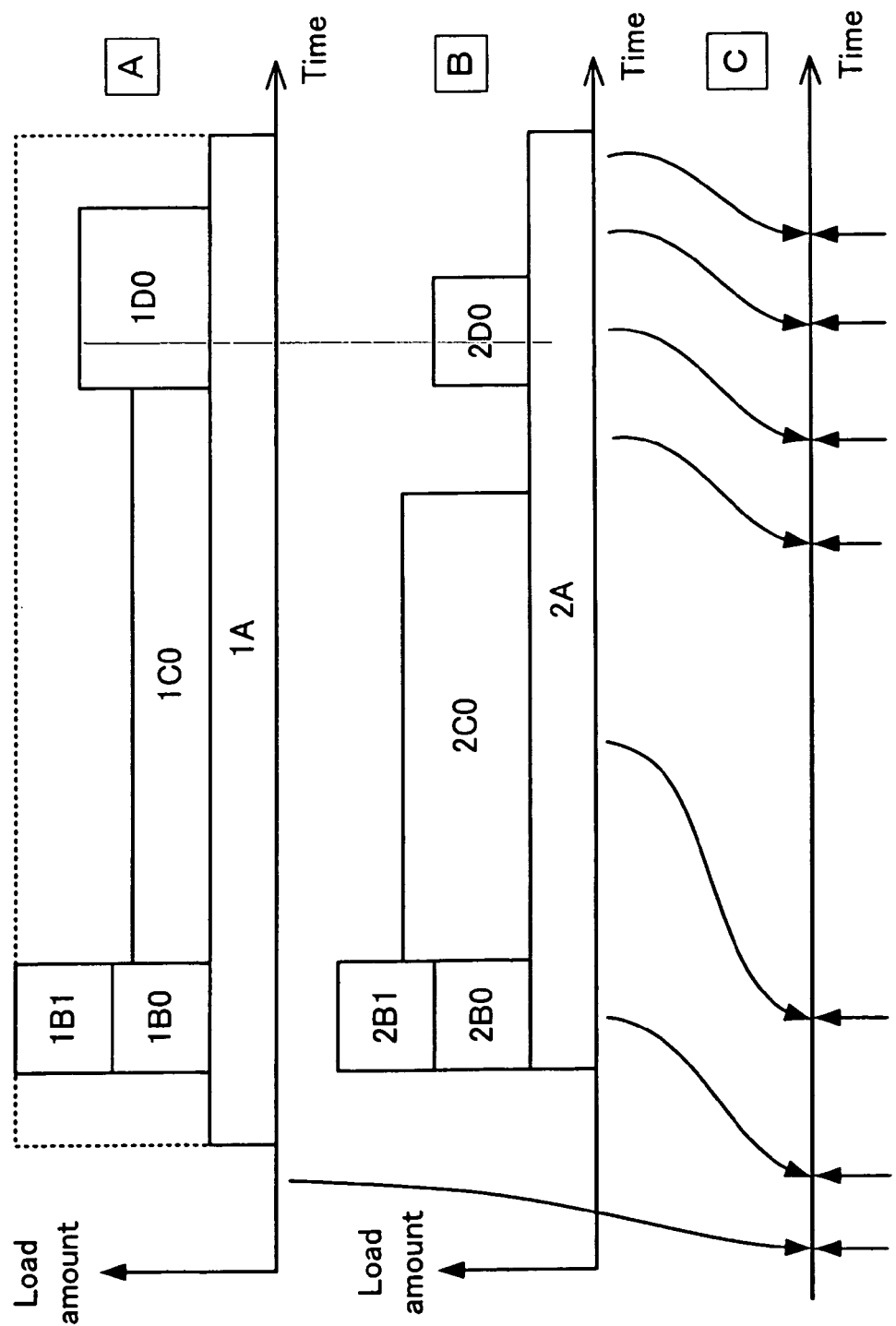
FIG. 5 is a time chart for explaining operation of the electronic device shown in FIG. 1.

More specifically, as denoted by a dotted line shown in A of FIG. 5, a square (maximum load amount that can be utilized for processing under the current voltage/frequency setting condition) obtained by a product of total processing time and highest load amount (processing 1B0+processing 1B1) is calculated. Then the load amount calculation circuit 53 calculates a quadrangle (load amount that can be utilized) denoted by a solid line and supplies the scheduler 57 with the calculated load amount.

The scheduler 57 further receives, from a voltage restriction section 54, a signal to set upper and lower limit values of a power supply voltage and receives, from a frequency restriction section 55, a signal to set upper and lower limit values of a clock frequency. The upper and lower limit values of a power supply voltage are determined based on the power supply specification of the power supply section 12 and circuit characteristics. The upper and lower limit values of a clock frequency are determined based on the operation specification and/or characteristics of circuits to be implemented. The values of the power supply voltage and clock frequency are thus restricted to ranges that do not exceed the upper and lower limit values.

The scheduler 57 further receives information from a mask pattern section 56. The mask pattern section 56 supplies the scheduler 57 with different pattern information in view of the operating characteristics of the chipset. In the case where the chipset is driven by a battery, the mask pattern section 56 supplies the scheduler 56 with pattern information that controls the operating voltage or clock frequency at short times depending on the load state. In the case where the chipset is driven by an AC adapter, the mask pattern section 56 supplies the scheduler 56 with pattern information that controls the operating voltage or clock frequency to a constant value irrespective of load state. Alternatively, the mask pattern section 56 provides pattern information that can be set by a user, such as full power mode or power saving mode.

Based on the above various information, the scheduler 57 generates information related to the voltage setting value to be supplied to the voltage controller 44 of FIG. 3 and the frequency setting value to be supplied to the clock frequency controller 46. The voltage setting value and frequency setting value are output through an output circuit 58 and supplied to the voltage controller 44 and clock frequency controller 46, respectively.

The voltage controller 44 controls the value of the voltage that the power supply section 12 outputs based on the voltage setting value. The clock frequency controller 46 controls the frequency of the high-speed clock that the high-speed clock generator 4 generates or the frequency of the low-speed clock that the low-speed clock generator 14 generates based on the frequency setting value.

As described above, the scheduler 57 optimizes the load for use in executing processing based on feedback information related to the currently-executed processing and various information related to processing to be subsequently executed. The scheduler 57 sequentially controls the clock frequency and power supply voltage, so that it is possible to change the clock frequency and power supply voltage depending on the load amount to thereby optimize the processing speed and power consumption.

FIG. 5 is a view showing operation of the chipset in the electronic device shown in FIG. 1.

The horizontal axis of FIG. 5 denotes elapsed time and the vertical axis denotes load amount. A, B of FIG. 5 denote the processing load in the control processing section 8. C of FIG. 5 denotes voltage/clock control timing. The upward arrows of C of FIG. 5 denote the timing of voltage/clock change instruction (control), and downward arrows denote the flow of the load information involved in all the processing on the same time axis.

A of FIG. 5 denotes an example of a processing initial state. For example, processing 1A denotes processing performed by operation of the system base block. Processing 1B0 denotes processing performed by the operation of the communication section. Processing 1B1 denotes processing performed by the operation of the voice processing section. Processing 1C0 denotes processing performed by the operation of the application section. Processing 1D0 denotes processing performed by a man-machine interface.

B of FIG. 5 denotes an example of scheduled processing. For example, processing 2A denotes processing performed by operation of the system base block. Processing 2B0 denotes processing performed by the operation of the communication section. Processing 2B1 denotes processing performed by the operation of the voice processing section. Processing 2C0 denotes processing performed by the operation of the application section. Processing 2D0 denotes processing performed by a man-machine interface.

The scheduler 57 previously collects the load information and optimizes the load for use in executing processing in order to optimally schedule all the processing on the same time axis. Further, at this time, the scheduler 57 can also acquire the restriction time information as known information. As a result, all load information have been prepared from A and B at the time of C of FIG. 5, so that it is possible to change the power supply voltage/clock frequency immediately before executing subsequent processing.

That is, at the time before execution of processing 2B1, 2B0, and 2A of the processing shown in A or B, the load involved in the processing 2B1, 2B0, and 2A is previously acknowledged and thereby the power supply voltage and clock frequency are previously changed at the timing denoted by the upward arrows C based on the active load information (downward arrows C).

In the above example of FIG. 5, processing 1B0, processing 1B1, processing 2B0, processing 2B1 are operations that need to be completed within a set period of time. Processing 1D0, processing 2D0 are operations that need to be started at a set time. Processing 1C0, processing 2C0 are time-unconstrained operations. There is much time between processing 2C0 and 2D0, as shown in B of FIG. 5. Thus, when processing 2C0 is extended, the processing load can correspondingly be reduced.

The quadrangle denoted by the dotted line in A of FIG. 5 denotes the maximum range of the processing that can be executed, wherein the processing are performed without the scheduling (frequency control/voltage control).

Although processing 1A precedes the other processing at the processing initial state in the case of A of FIG. 5, scheduling may be made such that processing 2A, 2B0, and 2B1 are started at the same time, as in the case of B of FIG. 5. That is, scheduling can be applied to both A and B of FIG. 5.

As described above, in the present invention, it is possible to reduce processing time even under the same load by executing processing at a high-speed clock. Although processing time is increased by using a low-speed clock, circuits can operate without the need of high voltage, so that it is possible to set a voltage to a lower level. That is, by changing the clock frequency and power supply voltage depending on the load amount, it is possible to perform processing with improved processing time and power consumption.

Although exemplary embodiments of the present invention have been shown and described, it will be apparent to those having ordinary skill in the art that a number of changes, modifications, or alternations to the invention as described herein may be made, none of which depart from the spirit of the present invention. All such changes, modifications, and alternations should therefore be seen as within the scope of the present invention.

What is claimed is:

1. An electronic device having a plurality of circuit blocks, each of the plurality of circuit blocks having at least one of a first circuit section or a second circuit section, comprising:

a first circuit block which includes, as the first circuit section, a communication section, a modem, and a voice processing section and includes, as the second circuit section, at least an I/O and control section;

a second circuit block which includes, as the first circuit section, a communication section and a modem and includes, as the second circuit section, at least a system base block and I/O and control section;

a third circuit block which includes, as the first circuit section, an application section for image processing and includes, as the second circuit section, at least an I/O and control section;

a fourth circuit block which includes, as the second circuit section, a timer circuit and a power supply section;

a user-operable operation section which is connected to the second circuit block provided with the system base block;

a clock generator which generates a first clock and a second clock having a frequency lower than that of the first clock and supplies the first circuit section and second circuit section with the first clock and second clock, respectively; and a power supply circuit which is provided in the power supply section and supplies the circuit sections operating at the first clock with a first power supply voltage and supplies the circuit section operating at the second clock with a second power supply voltage lower than the first power supply voltage.

2. The electronic device according to claim 1, further comprising a wireless section which processes signals that have been processed by the communication sections provided in the first and second circuit blocks and operates at the first clock.

3. The electronic device according to claim 1, wherein
each of the communication section, modem, and voice processing section in the first circuit block includes an analog signal processing section, and
each of the communication section and modem in the second circuit block includes a digital signal processing section.

4. The electronic device according to claim 1, wherein the electronic device is a terminal having a wireless communication function.

* * * * *